(12) United States Patent
Greer et al.

(10) Patent No.: US 8,389,094 B2
(45) Date of Patent: Mar. 5, 2013

(54) OPTICAL DATA STORAGE MEDIA AND METHODS OF FORMATION

(75) Inventors: Edward C. Greer, Lower Gwynedd, PA (US); Lujia Bu, Holden, MA (US)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 402 days.

(21) Appl. No.: 12/658,523

(22) Filed: Feb. 11, 2010

(65) Prior Publication Data
US 2010/0220583 A1 Sep. 2, 2010

Related U.S. Application Data

(60) Provisional application No. 61/207,345, filed on Feb. 11, 2009.

(51) Int. Cl.
*B32B 3/02* (2006.01)
(52) U.S. Cl. .............. 428/64.1; 428/64.4; 430/270.11
(58) Field of Classification Search .......... 428/64.4; 430/270.11
See application file for complete search history.

(56) References Cited

U.S. PATENT DOCUMENTS

| | | | |
|---|---|---|---|
| 6,117,284 A * | 9/2000 | Mueller | 204/192.27 |
| 6,177,168 B1 | 1/2001 | Stevens | |
| 7,018,696 B2 | 3/2006 | Nee | |
| 7,684,309 B2 * | 3/2010 | Mueller | 369/275.5 |
| 2006/0105134 A1 | 5/2006 | LeBlanc, III et al. | |
| 2007/0042294 A1 | 2/2007 | Sugaya et al. | |
| 2008/0226889 A1 | 9/2008 | Bu et al. | |

FOREIGN PATENT DOCUMENTS

| | | |
|---|---|---|
| EP | 0 797 194 | 9/1997 |
| EP | 1 308 944 | 5/2003 |
| EP | 1 898 406 | 3/2008 |
| EP | 1 959 443 | 8/2008 |
| JP | 2001 134981 | 5/2001 |

OTHER PUBLICATIONS

European Search Report of corresponding European Application No. 10 15 3156, Sep. 9, 2010.

\* cited by examiner

*Primary Examiner* — Elizabeth Mulvaney
(74) *Attorney, Agent, or Firm* — Jonathan D. Baskin

(57) ABSTRACT

Provided are methods of forming multi-layered optical data storage media which include a high-density data layer, as well as multi-layered optical data storage media that can be formed by such methods.

9 Claims, 3 Drawing Sheets

OPTICAL DATA STORAGE MEDIA AND METHODS OF FORMATION

This application claims the benefit under 35 U.S.C. §119 (e) of U.S. Provisional Application No. 61/207,345, filed Feb. 11, 2009, the entire contents of which are herein incorporated by reference.

This invention relates generally to optical data storage media and to their methods of formation. More specifically, optical data storage media having a plurality of data layers including a high-density data layer and their methods of formation are described. The invention allows for reductions in time and complexity in manufacturing multilayered high-density data storage media.

Optical media are the primary means of inexpensive, high-density data storage because they offer high storage capacity coupled with reasonable cost per byte of data stored. The use of optical data storage in such formats as compact disc (CD), digital versatile disc (DVD), multilayer structures such as DVD-5 and DVD-9, multi-sided formats such as DVD-10 and DVD-18, write-once and re-writable formats such as CD-R, CD-RW, DVD-R, DVD-RW, DVD+R, DVD+RW, DVD-RAM and the like is known. More recently, advances in technology have provided media capable of even higher data storage density such as HD-DVD and Blu-ray Disc™ formats.

In pre-recorded optical media, data take the form of pits and grooves formed in the surface of a plastic workpiece using a method such as injection molding, compression molding, stamping or the like, to form a data layer. A reflective layer is coated over the data layer to allow the data to be read by an optical system. For CD technologies, the pits typically have a minimum length of 0.83 micrometers (µm) and are read with lasers having an output wavelength of about 785 nanometers (nm), using a lens with a numerical aperture of about 0.45. Most CD formats provide data densities of about 0.74 gigabytes (GB) per layer. Higher densities are achieved with DVD technologies. In order to read the smaller pits in a DVD layer, typically 0.40 µm in minimum pit length, a red laser beam with a wavelength of about 650 nm is used with a lens having a numerical aperture of about 0.6. This permits a much higher data storage density than that available on a CD. For example, in the DVD-5 format, a data storage density of about 4.7 GB per layer is achieved. HD-DVD and Blu-ray storage media have storage densities of about 15 GB per layer and 23 to 27 GB per layer, respectively. These higher storage densities are achieved using a GaN semiconductor laser having a wavelength output of about 405 nm. With HD-DVD and Blu-ray technologies, a lens having a numerical aperture of about 0.65 and 0.85, respectively, is used. Minimum pit lengths for HD-DVD and Blu-ray data layers are typically 0.2 µm and 0.15 µm, respectively.

In order to store more data on a single disc, the use of multiple data layers can be beneficial. Various methods can be used to produce multilayered data storage media. For example, one method of forming a DVD having two information layers is to bond together two discs having about half the thickness of a single layer DVD. One of the data layers can be made to be readable from the front side while the other data layer is readable from the back side or, alternatively, both data layers can be made to be readable from a single side. In the latter case, a semi-reflective layer is employed for the data layer nearer to the laser source and a fully reflective layer is used for the other data layer. This allows a portion of the laser light to pass through the semi-reflective layer and first data layer to the underlying highly reflective layer for reading of the second data layer.

Methods of making multilayered discs are known. For example, U.S. Pat. No. 6,177,168 to Stevens discloses a method for making a multilayered DVD disc using injection-molding techniques. Three workpieces are molded, two of which have one metallic information layer with the opposite side being flat and the third having two metallic information layers on opposite sides. The three workpieces are glued together in a sandwich configuration with the workpiece having two information layers being in the middle. The disclosed method presents various problems for purposes of preparing a multilayered disc having a high-density data layer, such as an HD-DVD or Blu-ray format data layer. The aforementioned document discloses that the outer workpieces should have a thickness of about 0.550 millimeters (mm), while the thickness of the middle workpiece is determined by the minimum thickness that provides structural integrity, about 0.300 mm in the illustrative embodiment. The wavelengths and numerical apertures for HD-DVD and Blu-ray discs, however, place stringent tolerance requirements on the optical path length. In this regard, the focus budget for the two formats is about 1.7 µm and 1 µm for HD-DVD and Blu-ray formats, respectively. With the relatively large minimum thicknesses typical of injection molded workpieces and the tight tolerance requirements of the high-density formats, the use of injection molding is generally unsuitable to form multiple high density data layers to be read from the same side.

Hence, there remains a need for improved methods of forming multi-layer optical data storage media which include a high-density format data layer such as an HD-DVD or Blu-ray formatted data layer. As well, there is a need for such optical data storage media.

According to a first aspect of the invention, methods of forming an optical data storage medium are provided. The methods involve: (a) providing a first freestanding workpiece, the first workpiece comprising a front surface and a back surface, at least one of the first workpiece front surface and back surface having a first data layer comprising a plurality of data pits; (b) forming a first reflective layer in proximity to the first data layer; (c) providing a second freestanding workpiece, the second workpiece comprising a front surface and a back surface, at least one of the second workpiece front surface and back surface having a second data layer comprising a plurality of data pits; (d) forming a second reflective layer in proximity to the second data layer; (e) providing a polymeric layer over the first workpiece; (f) pressing a mold into the polymeric layer to form a third data layer in the polymeric layer, wherein the third data layer comprises a plurality of data pits having a minimum pit length of 0.25 µm or less; (g) separating the mold from the polymeric layer; (h) forming a third reflective layer in proximity to the third data layer; and (i) attaching the first workpiece to the second workpiece.

According to a further aspect of the invention, an optical data storage medium is provided. The optical data storage medium includes: a first freestanding workpiece comprising a front surface and a back surface, at least one of the first workpiece front surface and back surface having a first data layer comprising a plurality of data pits; a first reflective layer in proximity to the first data layer; a second freestanding workpiece, the second workpiece comprising a front surface and a back surface, at least one of the second workpiece front surface and back surface having a second data layer comprising a plurality of data pits; a second reflective layer in proximity to the second data layer; a polymeric layer comprising a third data layer over the first workpiece, wherein the third data layer comprises a plurality of data pits having a minimum pit length of 0.25 µm or less; and a third reflective layer in proximity to the third data layer.

As used herein, the term "in proximity to" is inclusive of items so identified being in direct contact with each another, separated by one or more other layers or materials or a combination thereof. In the context of a reflective layer being in proximity to a data layer, such proximity allows reading of the data layer by a laser-based optical system based on reflected and non-reflected signals from the reflective layer.

Also as used herein, the term "high-density data layer" means a data layer which comprises pits having a minimum pit length of 0.25 µm or less, such as 0.21 µm or less, 0.17 µm or less, or 0.15 µm or less, for example, about 0.2 µm (HD-DVD format) or about 0.15 µm (Blu-ray format).

Also as used herein, the term "highly reflective layer" means a layer having a reflectivity of about 80 percent or more at a reading wavelength, typically a wavelength of 400 nm to 800 nm, for example, 785 nm for CDs, 650 nm for DVDs and 405 nm for Blu-ray and HD-DVD formats.

Also as used herein, the term "semi-reflective layer" means a layer having a reflectivity at a reading wavelength sufficient to allow reading of the data layer associated with such layer, and also being sufficiently transmissive at the reading wavelength to allow a substantial amount of light to pass therethrough so that the laser beam can reach an underlying reflective layer and reflect back through the semi-reflective layer to an optical signal detector to allow reading of an underlying data layer. A semi-reflective layer typically has a reflectivity of about 18 to 50 percent at a reading wavelength.

Also as used herein, the term "reflective layer(s)" encompasses highly reflective layer(s) and semi-reflective layer(s).

Also as used herein, "$T_g$", glass transition temperature, is measured by differential scanning calorimetry (DSC) taking the mid-point in the heat flow versus temperature transition as the $T_g$ value.

The present invention will be discussed with reference to the following drawings, in which like reference numerals denote like features, and in which.

Figure 1:
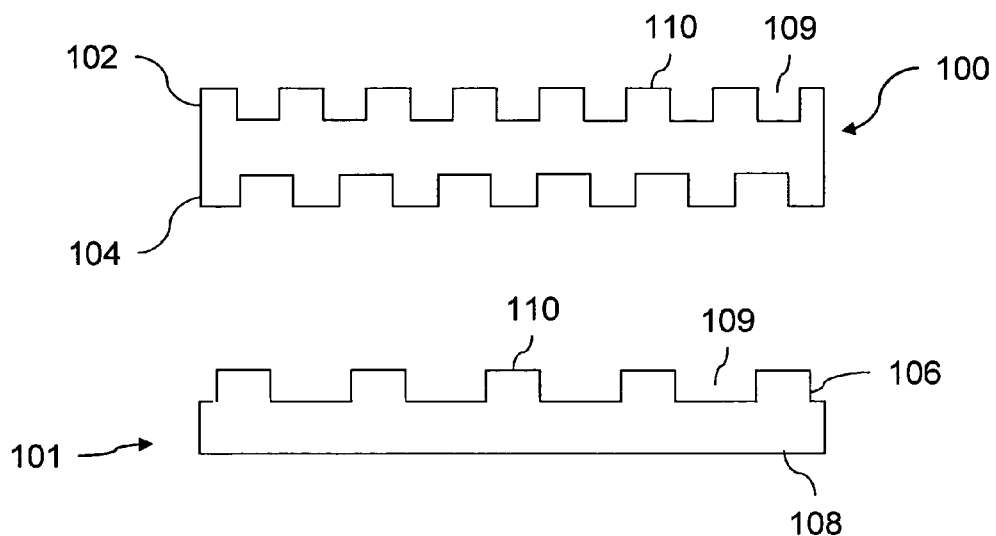
FIG. 1 illustrates a first freestanding workpiece having a first and second data layer and a second freestanding workpiece having a third data layer in accordance with an exemplary aspect of the invention.

Exemplary aspects of the invention will now be described with reference to the drawings. FIG. 1 shows first and second freestanding workpieces 100, 101. First freestanding workpiece 100 has a data layer 102 of encoded information on the workpiece front surface and a data layer 104 of encoded information on the workpiece back surface. The second freestanding workpiece 101 includes a data layer 106 of encoded information on the workpiece front side and has a planar back surface 108. It should be understood in the context of the drawings that the designations of "front surface" or "front side" and "back surface" or "back side" are to denote opposite sides of the specified component (e.g., workpiece or optical data storage media) without reference to particular function or orientation in actual use. Either or both of the first and second workpieces 100, 101 can independently have a single data layer on the front or back surface as illustrated for the second workpiece 101 or a two-data layer structure with data layers on the front and back surface as illustrated for the first workpiece 100. The data layers 102, 104, 106 each include a plurality of miniature information pits 109 and lands 110 precisely arranged in a predetermined pattern. Once formed, each data layer 102, 104, 106 serves as a template for a respective optically reflective layer to be disposed over the information pits and lands.

The first and second workpieces 100, 101 should be of sufficient thickness to be freestanding and to withstand the processes to be conducted, for example, spin coating, bonding, compression molding, metallization, baking, and other fabrication processes used in the manufacture of optical data storage media without undergoing physical distortion or warping. Moreover, where light is to pass through the first and/or second workpiece for data reading and/or writing, such workpiece(s) should be sufficiently transparent to permit transmission of a substantial fraction of the laser light used to read or write the optical data storage medium. While the minimum thickness of the workpieces that satisfies the above requirements would depend on the particular material being used, a workpiece having a thickness of about 0.3 mm or greater, for example, 0.4 mm or greater, would be typical to ensure sufficient rigidity and structural integrity. Notwithstanding the foregoing, commercial optical data storage media typically have standardized thickness specifications. For example, a Blu-ray format disc has a standard thickness of between about 1.10 and 1.22 mm. Without intending to limit the present invention, such an industry standard for current commercial discs can impose practical design constraints in practice. In addition to commercial specifications and mechanical constraints, optical specifications such as focus budget can impose a limit on the thickness of the workpiece and various layers within the optical data storage media. The first and second freestanding workpieces 100, 101 can, for example, have thicknesses of 0.57 to 0.60 mm and 0.59 to 0.61 mm, respectively. In an exemplary optical data storage medium, the first workpiece 100 has a thickness of about 0.59 mm and the second workpiece 101 has a thickness of about 0.6 mm.

Given the tremendous diversity of polymer chemistries, precursors, synthetic methods, reaction conditions, and potential additives, numerous polymer systems can be used to form the workpieces 100, 101. Variations in the materials used are typically driven by the need for particular material properties, for example, one or more of stiffness, water or gas permeability, optical transparency and temperature stability. Suitable materials for the workpieces 100, 101 are known in the art and include, for example, polycarbonates, (meth)acrylates, modified polyphenylene oxides, polyphenylene oxide/polystyrene alloys, cyclic polyolefins (such as polynorbornenes) and combinations and blends thereof. Of these materials, polycarbonates are typical, for example, Bayer Makrolon™ DP1-1265. The workpieces are typically an optically transparent material as required by the application. The workpieces can be made using techniques known in the art, for example, injection- or compression-molding, solution casting or extrusion techniques. Depending on the process used, formation of the data layers 102, 104, 106 may require an additional imprinting step to form the pits 109 and lands 110.

Figure 2:
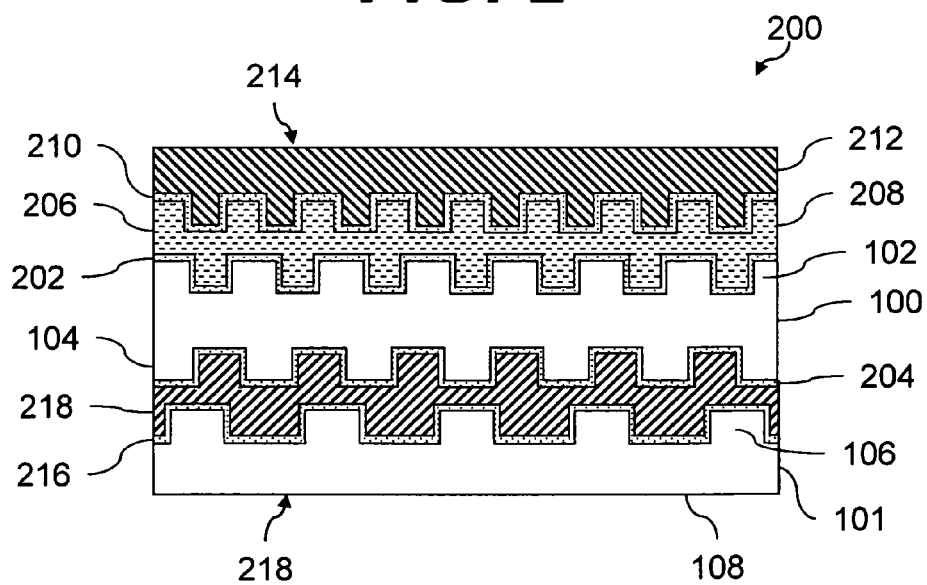
FIG. 2 illustrates an optical data storage medium having four data layers in accordance with a further exemplary aspect of the invention.

FIG. 2 illustrates an optical data storage medium 200 in accordance with a first exemplary aspect of the invention, which includes four data layers of encoded information. The optical data storage medium includes a first and second workpiece 100, 101 as described above. The optical data storage medium further includes a first reflective layer 202 in proximity to first data layer 102, a second reflective layer 204 in proximity to second data layer 104, a polymeric layer 206 over the first reflective layer 202 which includes a third data layer 208 of encoded information in a high-density format (with a plurality of data pits having a minimum pit length of 0.25 µm or less), a third reflective layer 210 in proximity to the third data layer 208, a cover layer 212 over the third reflective layer on the front side 214 of the optical data storage medium, a fourth reflective layer 216 in proximity to fourth data layer 106, and an adhesive layer 218 between the second reflective layer 204 of the first workpiece 100 and the fourth reflective layer 216 of the second workpiece 101. The adhesive layer 218 allows for bonding of the first workpiece 100 to the second workpiece 101. The data storage medium can include additional layers or materials, for example, a label (not shown) on either or both of the front side 214 and back side 218 of the optical data storage medium, a cover layer (not shown) on the back side 218 of the optical data storage medium, or additional protective layers such as fingerprint resistant, scratch resistant and moisture barrier layers. At least the third data layer 208 is of a high-density format such as Blu-ray format. One or more of the first, second and fourth data layers 102, 104, 106 can be of the same format as the third data layer 208 or can be of a different format, such as CD, DVD or a different high-density format. In an exemplary device, the first and third data layers 102, 208 are of the same or different high-density format.

The first, second, third and fourth reflective layers 202, 204, 210, 216 are in proximity to respective data layers 102, 104, 208, 106 to allow reading of the data layers by a laser-based optical system. In the exemplified device, the first, second, third and fourth reflective layers 202, 204, 210, 216 are each in direct contact with their associated data layers 102, 104, 208, 106. It should be clear, however, that one or more layers or materials can be disposed between the reflective layers and associated data layers if desired, such as materials to promote adhesion between the reflective layers and data layers as long as the data layers are readable by an optical system.

The reflective layers 202, 204, 210, 216 are generally conformal with their associated data layers 102, 104, 208, 106. The reflective layers can be independently selected to be highly reflective or semi-reflective depending on how the optical data storage medium is to be function. For example, if the first and second reflective layers 202, 204 are fully reflective and the third and fourth reflective layers 210, 216 are semi-reflective, data contained in the first and third data layers 102, 208 can be read from the front side 214 of the optical data storage medium while data contained in the second and fourth data layers 104, 106 can be read from the back side 218 of the optical data storage medium. In an exemplary aspect of the invention, the optical data storage medium can be read from one side in a first data format and from the opposite side in a second data format. For example, the optical data storage medium can be read from the front side 214 in a high-density format such as a Blu-ray format and read from the opposite side 218 in a DVD or other format.

As a further example, if the second and fourth reflective layers 204, 216 are highly reflective and the first and third reflective layers 202, 210 are semi-transmissive, the data contained in the first, second and third data layers 102, 104, 208 can be read from the front side 214 of the optical data storage medium, while data in the fourth data layer 106 can be read from the back side 218.

As a further example, the first, second and third reflective layers 202, 204, 210 can be semi-transmissive, while the fourth reflective layer 216 is highly reflective. In this case, the first, second, third and fourth data layers 102, 104, 208, 106 can all be read from the front side 214 of the optical data storage medium.

As discussed above, a label (not shown) can optionally be disposed on either or both of the front and back surface 214, 218 of the optical data storage medium. The label can be opaque or essentially transparent to the read wavelength depending on whether light is to be introduced through the label. The latter configuration can provide "read through" capability for the purpose of reading data while, at the same time providing information about the contents of the optical data storage medium to the user.

Exemplary methods of forming the optical data storage medium depicted in FIG. 2 will now be described. While particular process sequences are described for purposes of the exemplified device, it should be clear that other sequences can be readily implemented by those skilled in the art.

The first and second freestanding workpieces 100, 101 with data layers 102, 104, 106 can be formed as described above with respect to FIG. 1. The second reflective layer 204 is formed over the second data layer 104 of the first workpiece 100 and the fourth reflective layer 216 is formed over the fourth data layer 106 of the second workpiece 101. As described above, the second and fourth reflective layers 204, 216 can be highly reflective or semi-reflective at the reading wavelength(s). Suitable highly reflective and semi-reflective materials for optical data storage media and their deposition techniques are known in the art and described, for example, in U.S. Pat. Nos. 5,171,392, 6,007,889, 6,280,811, 6,451,402, 6,764,735, 6,790,503, 6,544,616 B2, 6,852,384, and 6,841,219 7,384,677. Typical highly reflective materials include, for example, aluminum, copper, silver, gold, and alloys thereof. Of these, aluminum and aluminum alloys are typical for lower data density formats, and silver and silver alloys are typical for higher data density formats. While dependent on the particular material being used, the highly reflective layers are typically 40 to 100 nm in thickness. Suitable semi-reflective materials include, for example, silicon, gold, silver, silver-based alloys such as those with one or more alloying materials chosen from gold, palladium, copper, rhodium, ruthenium, osmium, iridium, zinc, aluminum, platinum, magnesium, silicon, cadmium, tin, lithium, nickel, cobalt, manganese, indium, chromium, antimony, gallium, boron, molybdenum, zirconium, beryllium, titanium and germanium, copper and copper-based alloys such as those with one or more alloying materials chosen from silver, cadmium, gold, magnesium, aluminum and nickel. While dependent on the particular material, a typical thickness for the semi-reflective material is 5 to 70 nm. The transmissive/reflective properties of the materials will depend to some extent on the thickness of the materials, with a thinner coating typically providing greater transmissivity. It should be clear that the reflective layers can be a single layer or comprise a plurality of layers of the same or different materials in a stacked arrangement. The reflective layers may be deposited by well-known deposition techniques such as physical vapor deposition (PVD) including sputtering, evaporation and ion plating, electroless plating and chemical vapor deposition (CVD) techniques, with the particular technique selected being dependent on, among other considerations, the material to be deposited. The transmissive and reflective properties of the films depend on factors such as film thickness, material composition, the wavelength of the light and surface roughness.

The first and second workpieces 100, 101 can next be bonded together using known materials and techniques by applying a layer of an adhesive 218 to one or both of the first and second workpieces. For example, the adhesive can be applied to the backside of the first workpiece 100 over the second reflective layer 204 and/or to the front side of the second workpiece over the fourth reflective layer 216. The backside of the first workpiece 100 is then brought into contact with the front side of the second workpiece 101 and pressure is applied. Coating techniques useful for applying the adhesive include, for example, spin coating, roll coating and screen printing. Typical adhesives include hot-melt glues and UV-curable photopolymers such as UV-curable acrylics, for example, Mader Plastilack Rengolux™ 3203-098 UV-curable adhesive. In hot-melt glue techniques, a melted thermoplastic resin is disposed on one or both of the first and second processed workpieces and the workpieces are pressed together under pressure. In UV bonding, the adhesive is UV-curable and is typically applied between the first and second processed workpieces by spin lamination. In this technique, the liquid UV-curable adhesive is applied to the first or second workpiece. The other of the first and second workpiece is placed on top of the adhesive-applied workpiece and the resulting structure is spun at high speed. The spinning causes the adhesive to spread across the bonding surface of the workpieces. With the use of UV radiation, the adhesive is cured to a solid and the two halves are bonded together as a unitary structure.

Following bonding of the first and second workpieces 100, 101, the front surface of the first workpiece can be processed. The first reflective layer 202 can be formed as described above with reference to the second and fourth reflective layers 204, 216. Polymeric layer 206 can next be formed over the first reflective layer 204. As described above, the third data layer is of a high-density format such as Blue-ray format and includes pits having a minimum pit length of 0.25 μm or less, such as 0.21 μm or less, 0.17 μm or less, or 0.15 μm or less, for example, about 0.2 μm (HD-DVD format) or about 0.15 μm (Blu-ray format). The polymeric layer 206 can be formed, for example, using the materials and techniques described in U.S. Application Publication No. 2008/0226889A1 to Bu et al, the contents of which are incorporated herein by reference.

In accordance with an exemplary aspect, the curable composition for forming the polymeric layer includes one or more polymerizable materials, a polymerization initiator and optionally one or more additives. Polymerizable materials suitable for use in the curable composition include, for example, those chosen from ethylenically unsaturated monomers, ethylenically unsaturated oligomers, epoxy monomers, epoxy oligomers, epoxides, lactones, lactams and imines. The polymerizable materials can include, for example, at least one monofunctional material and at least one multifunctional material.

Suitable monofunctional materials include, for example, those selected from monofunctional (meth)acrylates, epoxy (meth)acrylates, and urethane (meth)acrylates. The monofunctional material can be selected from monoethylenically unsaturated materials such as monoethylenically unsaturated acrylates and methacrylates. The monoethylenically unsaturated materials typically have a weight average molecular weight, for example, of 100 to 100,000 such as 100 to 50,000, 100 to 25,000, 100 to 15,000, 100 to 10,000, 100 to 5,000, 100 to 4,000, 100 to 3,000, 100 to 2,000, 100 to 1,000 or 100 to 500.

Suitable multifunctional materials include, for example, those selected from di- and tri-functional (meth)acrylates, epoxy (meth)acrylates and urethane (meth)acrylates. The at least one multifunctional material can be selected from multiethylenically unsaturated materials, for example, those having 2 to 4 polymerizable vinyl groups or 2 to 3 polymerizable vinyl groups. The multiethylenically unsaturated materials can have a weight average molecular weight, for example, of 100 to 100,000 such as 100 to 50,000, 100 to 25,000, 100 to 15,000, 100 to 10,000, 100 to 5,000, 100 to 4,000, 100 to 3,000, 100 to 2,000, 100 to 1,000 or 100 to 500.

The polymerization initiator can be selected from cationic initiators, radical initiators and combinations thereof. The polymerization initiator can further be selected from photo initiators, thermal initiators and combinations thereof. Suitable thermal initiators include, for example, thermal radical cure initiators from the classes of peroxides, persulfates and azides. Suitable photo initiators include, for example, benzophenones, acetophenone derivatives, alpha hydroxy ketones, monoacylphosphine oxides, bisacylphosphine oxides. The polymerization initiator is typically a photo initiator present in the curable composition in sufficient quantity to provide fast cure speeds, reasonable cost, good surface, thorough cure and lack of yellowing upon aging.

The curable composition can further comprise one or more optional additives. Such optional additives include, for example, UV absorbers, fillers, chain transfer agents, plasticizers, wetting agents, stabilizers, adhesion promoters, leveling agents, corrosion inhibitors, antifoaming agents, mold release additives, anti-sticking agents, fluorine-containing compounds, reactive diluents (e.g., phenoxy ethyl acrylates) and silane-containing compounds. Use of a mold release additive is typical. The mold release additive can be a material that selectively migrates to the air interface of the uncured curable composition. Exemplary mold release additives include dimethyl dichlorosilane, trimethyl chlorosilane and other silanizing agents, poly (perfluoroethers), polyether modified polysiloxanes such as polyether modified polydisiloxanes, and combinations thereof.

Exemplary curable compositions for forming the polymeric layer include: 50 to 65 wt % of an oligomer selected from a bisphenol A epoxy acrylate with a weight average molecular weight of 300 to 2,000, an oxirane, 2,2'-[(1-methylethylidine)bis(4,1-phenyleneoxymethylene)]bis-, homopolymer, 2-propenoate with a weight average molecular weight of 300 to 500, a diacrylate of diglycidyl ether bisphenol-A and an alkoxylated bisphenol A diacrylate; 10 to 20 wt % of a low $T_g$ monomer selected from $C_6$-$C_{22}$ alkyl acrylates and $C_6$-$C_{22}$ alkoxy acrylates, for example, from 2(2-ethoxyethoxy)ethyl acrylate, isodecyl acrylate and combinations thereof; 9 to 14 wt % of a high $T_g$ monomer, wherein the high $T_g$ monomer is isobornyl acrylate; 10 to 16 wt % of a difunctional monomer selected from 1,6-hexanediol diacrylate, tricyclododecanedimethanol diacrylate and combinations thereof; 4 to 9 wt % of a photo initiator, wherein the photo initiator is 1-hydroxy-cyclohexyl-phenyl-ketone; and 0 to 1.5 wt % of a mold release additive, wherein the mold release additive is polyether modified polydimethylsiloxane.

In accordance with an exemplary method of forming the polymeric layer 206, the curable composition is disposed in an uncured state on the first reflective layer 202. Known coating techniques such as roll coating, slot coating, screening, spin coating, patch die coating, slot or extrusion coating, slide or cascade coating, curtain coating, gravure coating, dip coating, spray coating, meniscus coating, brush coating, air knife coating, silk screen printing, electrostatic printing, thermal printing and ink jet printing can be used to coat the first workpiece with the curable composition. Of these, spin coating is typical. The deposited curable composition is exposed to a stimulus, typically actinic radiation such as UV radiation, causing the deposited curable composition to polymerize, forming a cured curable composition. The third data layer 208 is formed in the surface of the polymeric layer by an embossing process. In this process, a mold is pressed into the cured curable composition to form features therein, the features being readable as information in a high-density format such as Blu-ray or HD-DVD format. The mold is then separated from the cured curable composition. The polymeric layer typically has an average thickness of 0.02 to 0.03 mm, for example, 0.024 to 0.026 mm such as about 0.025 mm. Notably, the formation of the third data layer 208 does not require curing by actinic radiation while the mold is in contact with the cured curable composition.

The temperature of the mold at the moment the mold is pressed into the cured curable composition (i.e., the imprinting temperature) is typically higher than the temperature of the mold at the moment it is separated from the cured curable composition (i.e., the separating temperature). At least one of the mold, the cured curable composition and the workpiece are heated before pressing the mold into the cured curable composition and can be cooled before separating the mold and the cured curable composition. The mold is typically pressed into the cured curable composition with a pressure (i.e., the imprinting pressure) of 2.75 to 27.5 Megapascals (MPa). A mold release additive can be applied to at least one of the surface of the cured curable composition and the surface of the mold.

Following formation of the third data layer 208, the third reflective layer 210 is formed on the third data layer 208 using materials and techniques as described above with respect to the first, second and fourth reflective layers 202, 204, 216.

In accordance with a further aspect of the invention, one or more additional data layers can be formed over the third data layer 208 and third reflective layer 210 using the same materials and techniques described above with respect to the polymeric layer 206 and third data layer. The additional data layers can advantageously take the form of additional high density data layers having a minimum pit length of 0.25 µm or less. A first additional data layer can be formed by providing a polymeric layer and processing the polymeric layer in the same manner described above with respect to the third data layer. As with the third data layer, the additional data layer is formed by use of a mold and a reflective layer is formed in proximity to the fourth data layer. This process can be repeated for the number of additional data layers desired.

The cover layer 212 is next formed over the third reflective layer 210 on the front side 214 of the optical data storage medium. The cover layer 212 can, for example, provide one or more of the following functions: prevent damage to the underlying third reflective layer and third data layer; provide resistance to scratches and fingerprints; serve as a moisture barrier; serve as a gas barrier; serve as a planarizing layer; and serve as an optical path length. While shown as a single layer, the cover layer can include a plurality of layers. Where plural layers are used, the second cover layer can comprise a stack that includes, for example, an optical path length layer, an anti-scratch layer and an anti-fingerprint layer. Suitable materials for the cover layer include, for example, UV-curable acrylics, or lacquers, optionally containing silicone and/or inorganic nanoparticles such as silica nanoparticles. The UV-curable acrylics are typically di or trifunctional acrylics, including urethane-acrylic copolymers and epoxy-acrylic copolymers. Suitable cover layer materials are described, for example, in European Application Pub. No. EP 0 916 705 A2. Suitable cover layer materials are commercially available, such as those sold under the Durabis™ (TDK Corp., Japan) and Daicure™ (e.g., Daicure Clear SD 511) (DIC Eques Coatings, Netherlands) brands. The material used in forming the cover layer can be in liquid form and applied, for example, by spin coating. The cover layer can further take the form of a polymer film such as a polycarbonate film, which can be glued or laminated to the workpiece over the third reflective layer. Suitable such polymer films are commercially available, for example, Europlex™ polycarbonate film PC OF405 (Targray Technology International Inc., Montreal, Canada). The desired thickness of the cover layer will depend on factors such as the data layer format and wavelength of light to be used. In the case of a Blu-ray format data layer, the cover layer can be, for example, from 0.025 to 0.075 mm, while the thickness for DVD and HD-DVD data layer formats is about 0.6 mm. In an exemplary optical data storage medium, the cover layer is about 75 µm for an underlying Blu-ray data layer.

A label (not shown) such as described above can be applied to the front and/or backside of the optical data storage medium over the cover layer 212 and/or the back side 218 of the data storage medium. Optical data storage media formed in accordance with the invention can be read and/or written using commercial optical disc systems.

Figure 3:
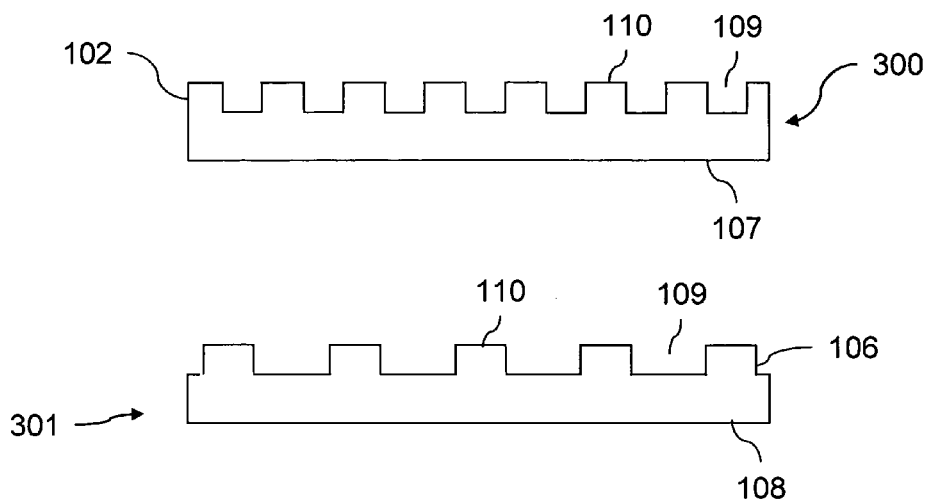
FIG. 3 illustrates a first freestanding workpiece having a first data layer and a second freestanding workpiece having a second data layer in accordance with an exemplary aspect of the invention.

A further exemplary optical data storage medium having three data layers will now be described with reference to FIGS. 3 and 4. FIG. 3 illustrates first and second freestanding data-imprinted workpieces 300, 101 which can be used in the formation of the optical data storage medium 400 illustrated in FIG. 4. The first and second freestanding workpieces 300, 101 are as described above with respect to workpieces 100, 101, respectively, except both workpieces have a single data layer 102, 106 of encoded information on the workpiece front side and a planar back surface 107, 108. In another aspect, both the first and second workpieces 300, 101 can have an additional data layer (not shown) on the back surface instead of the illustrated planar surfaces 107, 108.

Figure 4:
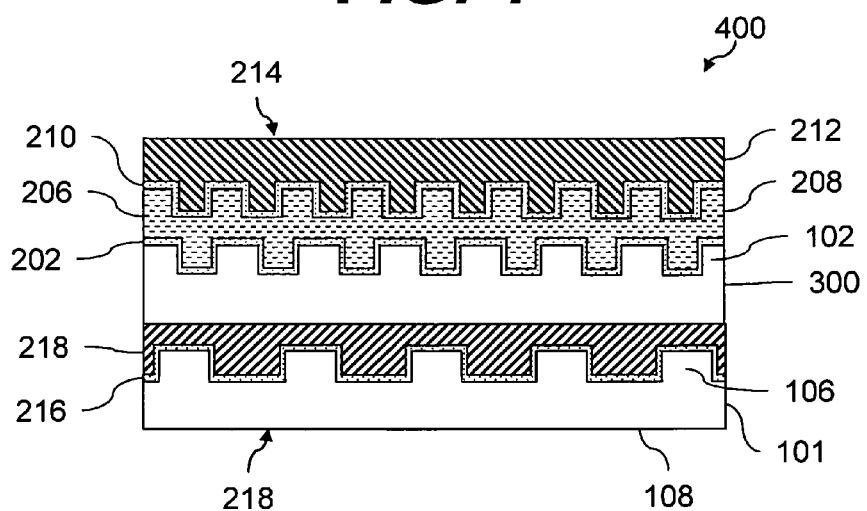
FIG. 4 illustrates an optical data storage medium having three data layers in accordance with a further exemplary aspect of the invention.

FIG. 4 illustrates an optical data storage medium 400 that includes three data layers of encoded information. The features of the data storage medium 400 are generally the same as those described above with reference to FIG. 2 except as otherwise noted. The optical data storage medium includes first and second freestanding workpieces 300, 101 as described above with respect to FIG. 3. The optical data storage medium 400 includes a first reflective layer 202 in proximity to the first data layer 102, a polymeric layer 206 over the first reflective layer which includes a second data layer 208 of encoded information in a high-density format, a second reflective layer 210 in proximity to the second data layer 208, and a first cover layer 212 over the second reflective layer on the front side 214 of the optical data storage medium. The optical data storage medium further includes a third reflective layer 216 in proximity to the third data layer 106 and an adhesive layer 218 between the back side 107 of the first workpiece 300 and the third reflective layer 216 of the second workpiece 101 for bonding of the first workpiece 300 to the second workpiece 101. The data storage medium can further include a label (not shown) over either or both of the first cover layer 212 and the back surface 108 of the second workpiece.

The description above with respect to the materials, orientation and techniques for the reflective layers 202, 204, 210, 216 is applicable to the reflective layer in the exemplified storage medium. As with the exemplary optical data storage medium shown in FIG. 2, the reflective layers in the data storage medium of FIG. 4 can independently be selected to have particular reflectivity/transmissivity characteristics depending on the desired functionality of the device. For example, if the first and third reflective layers 202, 216 are fully reflective and the second reflective layer 210 is semi-reflective, data contained in the first and second data layers 102, 208 can be read from the front side 214 of the optical data storage medium while data contained in the third data layer 106 can be read from the back side 218 of the optical data storage medium. In an exemplary aspect of the invention, the optical data storage medium can be read from one side in a first data format and from the opposite side in a second data format. For example, the optical data storage medium can be read from the front side 214 in a high-density format such as a Blu-ray format and read from the opposite side 218 in a DVD format.

As a further example, the first and second reflective layers 202, 210 can be semi-transmissive, while the third reflective layer 216 is highly reflective. In this case, the first, second and third data layers 102, 208, 106 can all be read from the front side 214 of the optical data storage medium.

Exemplary methods of forming the optical data storage medium depicted in FIG. 4 will now be described. Except where otherwise noted, the materials and techniques described above with respect to formation of the optical data storage media of FIG. 2 are also applicable to the storage medium shown in FIG. 4. The first and second freestanding workpieces 300, 101 with first and third data layers 102, 106 are formed. Third reflective layer 216 is formed over the third data layer 106 and the first and second workpieces 300, 101 are bonded together with adhesive layer 218. The first reflective layer 202 is formed over the first data layer 102 and the polymeric layer 206 with the second data layer 208 of high density format is formed over the first reflective layer. The second reflective layer 210 is formed over the second data layer 208 and the first cover layer 212 is formed over the second reflective layer 210 on the front side 214 of the optical data storage medium. An optional label (not shown) may be disposed over either or both of the cover layer 212 and the back surface 108 of the second workpiece.

Figure 5:
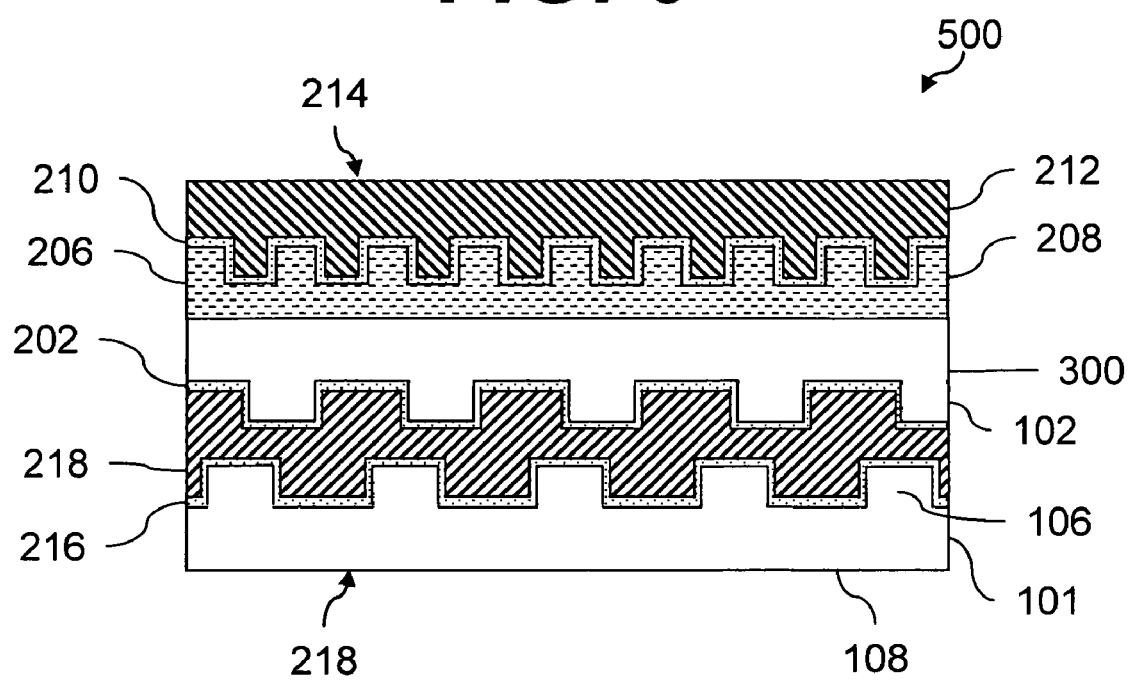
FIG. 5 illustrates an optical data storage medium having three data layers in accordance with a further exemplary aspect of the invention.

A further exemplary optical data storage medium having three data layers is illustrated in FIG. 5. The data storage medium is as described with respect to FIG. 4, except the first workpiece has a planar front surface and the first data layer 102 is formed as part of the back surface of the first workpiece. In an exemplary aspect, the third data layer 208 is of a high density format such as Blu-ray format and the first and second data layers 102, 106 are independently of a different format such as DVD.

Further exemplary optical data storage media and their methods of formation in accordance with the invention are described below.

EXAMPLE 1

An optical data storage medium 200 as illustrated in FIG. 2, in which two Blue-ray data layers 102, 208 are readable from the front side 214 of the disc and two DVD data layers 104, 106 are readable from the back side 218 of the disc, is formed as follows. First and second workpieces 100, 101 are formed from Bayer Makrolon™ DP1-1265 polycarbonate by injection compression molding to a thickness of 0.59 mm and 0.6 mm, respectively. The data layers 102, 104 of the first workpiece are of a Blu-ray format and DVD format, respectively. The data layer 106 of the second workpiece is of a DVD format. A fully reflective layer 204 (55 nm aluminum) is formed over the data layer 104 of the first workpiece 100 by sputtering. A semi-reflective layer 216 (11 nm silver/tin 99.5/0.5 wt %) is formed over the data layer 106 of the second workpiece 101 by sputtering. The first and second workpieces 100, 101 are bonded together by spin-lamination using a UV-curable adhesive 218 (25 μm, Mader Plastilack Rengolux™ 3203-098) and curing the adhesive with UV radiation. A fully reflective layer 202 (40 nm silver/tin 99.5/0.5 wt %) is formed over the data layer 202 by sputtering. A curable polymeric layer 206 (25 μm) is formed over the fully reflective layer 204 by spin coating a composition as described below. The curable polymeric layer is cured with UV-radiation using a Xe flashlamp. A nickel DVD stamper with Blu-ray format features is treated with a mold release additive. The workpiece and stamper are introduced into an embossing system which includes top and bottom chucks. The stamper is heated to 95° C. and is brought into contact with the cured polymeric layer under a 40 kN compressive force to force the stamper against the cured polymeric layer for 120 seconds. The stamper and chucks are cooled to below 50° C. and the compressive force is removed. The workpiece and stamper are removed from the system and the stamper is separated from the polymeric layer. A semi-reflective layer 210 (25 nm silver/tin 99.5/0.5 wt %) is formed over the data layer 208 by sputtering. A cover layer 212 comprising two layers is next formed over the third reflective layer 210 on the front side 214 of the optical data storage medium. The cover layer 212 is formed by spin-coating and UV-curing a first layer (Daicure EX-8226, 70 μm) over the third reflective layer, and a hard coat layer (Daicure EX-741, 5 μm) over the first layer. The resulting structure has reflective layers (from top to bottom) in the following configuration: semi-reflective 210/fully reflective 202/fully reflective 204/semi-reflective 216.

Curable polymeric composition: The composition for forming the curable polymeric layer is made as follows. A stainless steel reactor equipped with a mechanical stirrer is charged with 5600 g of difunctional bisphenol A based epoxy acrylate blended with 1400 g hexane diol diacrylate (blend available from Sartomer Company as CN104B80); 1300 g of isobornyl acrylate (available from Sartomer Company as SR506); and 1000 g of 2-(2-ethoxyethoxy)ethyl acrylate (available from Sartomer Company as SR256). The reactor contents are mixed for 10 minutes and 700 g of 1-hydroxy-cyclohexyl-phenyl-ketone (available from Ciba Chemical, Inc. as Irgacure 184) are added. The contents of the reactor are mixed for an additional 30 minutes. The contents of the reactor are filtered using a 0.1 μm pore size Nanoshield filter (available from CUNO LLC) and the filtered material is degassed.

EXAMPLE 2

An optical data storage medium 200 as illustrated in FIG. 2, in which two Blu-ray data layers 102, 208 and two DVD data layers 104, 106 are readable from the front side 214 of the disc, is formed using the same procedures and materials described above in Example 1, with exception of the reflective layers. The reflective layers, formed by sputtering, have the following configuration (from top to bottom): semi-reflective 210 (20 nm silver/tin 99.5/0.5 wt %)/semi-reflective 202 (22 nm silver/tin 99.5/0.5 wt %)/semi-reflective 204 (22 nm silver/tin 99.5/0.5 wt %)/fully reflective 216 (50 nm silver/tin 99.5/0.5 wt %).

EXAMPLE 3

An optical data storage medium 500 as illustrated in FIG. 5, in which two DVD data layers 102, 106 are readable from the back side 218, and one Blu-ray data layer 208 is readable from the front side 214, is formed as follows. A standard DVD9 workpiece 101 is formed by injection compression molding from Bayer Makrolon™ DP1-1265 polycarbonate, of thickness 0.6 mm. A semi-reflective layer 216 (11 nm silver/tin 99.5/0.5 wt %) is formed over the data layer 106 of workpiece 101 by sputtering. A second DVD9 workpiece 300 is formed by injection compression molding from Bayer Makrolon™ DP1-1265 polycarbonate, of thickness 0.59 mm. A fully reflective layer 202 (55 nm aluminum) is formed over the data layer 102 of the second workpiece 300 by sputtering. The workpieces 101, 300 are bonded together by spin-lamination using a UV-curable adhesive 218 (25 µm, Mader Plastilack Rengolux™ 3203-098) and curing the adhesive with UV radiation. A curable polymeric layer 206 (25 µm) is formed over top surface of the workpiece 300 by spin coating a composition as described in Example 1. The curable polymeric layer is cured with UV-radiation using a Xe flashlamp. A nickel DVD stamper with Blu-ray format features is treated with a mold release additive. The workpiece and stamper are introduced into an embossing system which includes top and bottom chucks. The stamper is heated to 95° C. and is brought into contact with the cured polymeric layer under a 40 kN compressive force to force the stamper against the cured polymeric layer for 120 seconds. The stamper and chucks are cooled to below 50° C. and the compressive force is removed. The workpiece and stamper are removed from the system and the stamper is separated from the polymeric layer. A fully reflective layer 210 (40 nm silver/tin 99.5/0.5 wt %) is formed over the data layer 208 by sputtering. A cover layer 212 comprising two layers is next formed over the third reflective layer 210 on the front side 214 of the optical data storage medium. The cover layer 212 is formed by spin-coating and UV-curing a first layer (Daicure EX-8226, 95 µm) over the third reflective layer, and a hard coat layer (Daicure EX-741, 5 µm) over the first layer. The resulting structure has reflective layers (from top to bottom) in the following configuration: fully reflective 210/fully reflective 202/semi-reflective 216.

What is claimed is:

1. A method of forming an optical data storage medium, comprising:
    (a) providing a first freestanding workpiece, the first workpiece comprising a front surface and a back surface, at least one of the first workpiece front surface and back surface having a first data layer comprising a plurality of data pits;
    (b) forming a first reflective layer in proximity to the first data layer;
    (c) providing a second freestanding workpiece, the second workpiece comprising a front surface and a back surface, at least one of the second workpiece front surface and back surface having a second data layer comprising a plurality of data pits;
    (d) forming a second reflective layer in proximity to the second data layer;
    (e) providing a polymeric layer over the first workpiece;
    (f) pressing a mold into the polymeric layer to form a third data layer in the polymeric layer, wherein the third data layer comprises a plurality of data pits having a minimum pit length of 0.25 µm or less;
    (g) separating the mold from the polymeric layer;
    (h) forming a third reflective layer in proximity to the third data layer; and
    (i) attaching the first workpiece to the second workpiece; wherein the providing the polymeric layer comprises forming a curable layer over the first workpiece and curing the curable layer with photonic and/or thermal energy prior to pressing the mold into the polymeric layer.

2. The method of claim 1, wherein the second data layer comprises a plurality of data pits having a minimum pit length of 0.25 µm or less.

3. The method of claim 2, wherein the polymeric layer is applied to the first freestanding workpiece by spin coating.

4. The method of claim 1, wherein the first and second freestanding workpieces are each formed by a molding process.

5. The method of claim 1, wherein the first workpiece further comprises a fourth data layer comprising a plurality of data pits, wherein the first data layer is disposed on the front surface of the first workpiece and the fourth data layer is disposed on the back surface of the first workpiece such that the first data layer is disposed between the third and fourth data layers, the method further comprising forming a fourth reflective layer in proximity to the fourth data layer.

6. The method of claim 1, wherein the first data layer and/or the second data layer have a minimum pit length of 0.35 µm or more.

7. The method of claim 1, further comprising:
    providing a second polymeric layer over the third data layer;
    pressing a mold into the second polymeric layer to form a fourth data layer in the second polymeric layer;
    separating the mold from the second polymeric layer, wherein the fourth data layer comprises a plurality of data pits having a minimum pit length of 0.25 µm or less; and
    forming a fourth reflective layer in proximity to the fourth data layer.

8. The method of claim 1, wherein the first and third reflective layers are semi-transmissive.

9. An optical data storage medium formed by the method of claim 1, comprising:
    a first freestanding workpiece comprising a front surface and a back surface, at least one of the first workpiece front surface and back surface having a first data layer comprising a plurality of data pits;
    a first reflective layer in proximity to the first data layer;
    a second freestanding workpiece, the second workpiece comprising a front surface and a back surface, at least one of the second workpiece front surface and back surface having a second data layer comprising a plurality of data pits;
    a second reflective layer in proximity to the second data layer;
    a polymeric layer comprising a third data layer over the first workpiece, wherein the third data layer comprises a plurality of data pits having a minimum pit length of 0.25 µm or less; and
    a third reflective layer in proximity to the third data layer.

* * * * *